United States Patent [19]
Brooks et al.

[11] Patent Number: 5,295,059
[45] Date of Patent: Mar. 15, 1994

[54] PROGRAMMABLE CONTROLLER WITH LADDER DIAGRAM MACRO INSTRUCTIONS

[75] Inventors: Jeffery W. Brooks, Mentor-on-the-Lake; Michael D. Yoke; John J. Kolat, Jr., both of Mentor, all of Ohio

[73] Assignee: Allen-Bradley Company, Inc., Milwaukee, Wis.

[21] Appl. No.: 942,254

[22] Filed: Sep. 9, 1992

[51] Int. Cl.⁵ ................... G06F 15/46; G05B 19/00
[52] U.S. Cl. ........................ 364/147; 364/131
[58] Field of Search ............ 364/131, 134, 147, 949, 364/946.2, 946.3

[56] References Cited

U.S. PATENT DOCUMENTS

| | | | |
|---|---|---|---|
| 3,813,649 | 5/1974 | Struger et al. | 340/172.5 |
| 4,070,702 | 1/1978 | Grants et al. | 364/200 |
| 4,115,853 | 9/1978 | Dummermuth | 364/200 |
| 4,165,534 | 8/1979 | Dummermuth et al. | 364/900 |
| 4,172,289 | 10/1979 | Struger et al. | 364/900 |
| 4,302,820 | 11/1981 | Struger et al. | 364/900 |
| 4,488,258 | 12/1984 | Struger et al. | 364/900 |
| 4,858,101 | 8/1989 | Stewart et al. | 364/131 |
| 5,042,002 | 8/1991 | Zink et al. | 364/900 |
| 5,162,986 | 11/1992 | Graber et al. | 364/146 |

*Primary Examiner*—Jerry Smith
*Assistant Examiner*—Paul Gordon
*Attorney, Agent, or Firm*—Quarles & Brady

[57] ABSTRACT

A machine is operated by a programmable controller that executes a ladder logic control program. A custom ladder logic processor is provided for high speed execution of the more common ladder logic instructions and a microprocessor interprets the remaining ladder logic instructions. A first section of memory contains a ladder logic control program in which some of the instructions are macro instructions executable by the ladder logic processor. Each macro instruction specifies an operation code, a first memory file containing data to be processed by the macro instruction, a second memory file containing control data governing the processing, and a storage location for results produced by execution of the macro instruction. Another memory section stores a library file containing a ladder logic software routine for each macro instruction, and stores a directory which identifies a starting location of the macro instruction routine for each operation code. When a macro instruction is encountered in the control program, the corresponding ladder logic software routine is executed. During the execution of the routine data is obtained from the first memory file and the results are placed in the storage location. At the completion of the ladder logic software routine, execution of the control program resumes.

11 Claims, 4 Drawing Sheets

SHARED SYSTEM RAM

MACRO CONTROL FILE

MACRO INSTRUCTION LIBRARY

MACRO DIRECTORY
61

PROGRAMMABLE CONTROLLER WITH LADDER DIAGRAM MACRO INSTRUCTIONS

The present invention relates to programmable controllers for operating industrial equipment, and more specifically to the processors which execute a ladder logic control program that defines the operation of the equipment.

BACKGROUND OF THE INVENTION

A programmable controller is a type of general purpose industrial computer which controls the operation of manufacturing equipment, such as an assembly line or a machine tool, in accordance with a stored program. The program comprises a series of process control instructions which are read out and executed to examine the condition of selected sensing devices on the controlled equipment, and to energize or deenergize selected operating devices contingent upon the status of one or more of the examined sensing devices.

The state of many sensing and operating devices can be represented by a single bit of data which is manipulated by the control program instructions. Other devices, such as position sensors, provide multiple bits of data representing a condition of the equipment being controlled. For these latter devices, instructions are provided to manipulate bytes and words of data representing the state of the sensing and operating devices. Additional program instructions perform arithmetic operations, timing and counting functions, and complex statistical reporting operations. These instructions have become quite standardized in the industry and are directly associated with the elements of a ladder logic diagram which is easily understood by process control engineers. Program panels such as those described in U.S. Pat. Nos. 3,808,612; 3,813,649 and 4,070,702 have been developed to assist the user in developing and editing ladder logic control programs comprised of such programmable controller instructions.

As the need developed to control ever more complex manufacturing processes, the programmable controller and its set of instructions became more elaborate. A processor module which executed the instructions became divided into two different processor circuits, such as a Boolean logic processor for manipulating single bits of input and output data and a microprocessor for performing more complex arithmetic and logic operations. The Boolean logic processor directly executed a subset of the ladder logic instruction set. The microprocessor executed an interpreter program that contained a series of machine language routines for performing the functions defined by the remaining ladder logic program instructions. An example of this type of programmable controller is described in U.S. Pat. No. 4,165,534.

This evolution of the programmable controller also provided the main ladder logic program with the capability of calling a ladder logic subroutine. The subroutine was designated in the ladder diagram by inserting an operation block which had a fixed operation code (e.g. JSR) and which specified a unique program file that contained the instructions of the subroutine. In order to pass data from the main ladder logic program to the subroutine, the programmer has to specify each item of data in the subroutine operation block. Each time the subroutine was called from the main program, the parameters were copied sequentially one by one into a parameter list defined in the subroutine. A similar definition and copying process is required to transfer the results of the subroutine to the main ladder logic program. This dual copying process was relatively time consuming.

Previously each subroutine was stored in the programmable controller as a separate program file. Many programmable controllers have a limit on the number of program files which can be stored and accessed. As a consequence, the use of many subroutines could significantly reduce the number of program files available for other routines.

The need also developed to provide custom functions and ladder logic instructions for specific industries and certain types of industrial equipment. It is expensive and time consuming to redesign the processor hardware and software for each unique need. Thus it is often impractical to create special ladder logic instructions for each segment of the programmable controller market. To satisfy this need programmable controllers were developed that can execute a custom application routine written in machine language instructions and called from the ladder logic control program, as described in U.S. Pat. No. 4,302,820. Although this technique can be used effectively to provide custom, complex functionality to a conventional programmable controller, the transition to and from the execution of the machine language program consumed relatively long processing time as control had to be transferred from the ladder logic processor to the microprocessor. In addition, an end user accustomed to programming with ladder diagrams had difficulty preparing the custom application routines which had to be written in machine language instructions.

SUMMARY OF THE INVENTION

A programmable controller includes a plurality of input and output modules electrically connected to a processor module which repeatedly executes instructions of a stored control program. The input and output modules interface to sensing and actuating devices on machinery operated by the programmable controller. The processor module preferably includes a ladder logic processor and a microprocessor which cooperate in executing a user defined control program that examines the status of selected sensing devices and controls actuating devices on the machinery. The ladder logic processor executes bit oriented instructions, while more complex ladder logic instructions are handled by the microprocessor.

The control program instruction set includes a macro instruction which defines an operation that is performed by a macro routine written in ladder logic instructions. The macro instruction specifies an operation code, a first file containing data to be processed by the macro instruction, and a storage location for results produced by execution of the macro instruction. If required by the function to be performed, the macro instruction also specified a second file containing control data for the function. The first and second files are stored in one section of memory. A second memory section contains a macro instruction routine having a plurality of ladder logic instructions which typically are executed by said ladder logic processor in response to execution of the macro instruction. During the execution of the macro instruction routine, the ladder logic processor obtains the required data from the first file. At the completion of the routine, the results of the processing are stored at the location specified in the macro instruction.

In the preferred embodiment, the programmable controller is capable of executing a number of macro instructions. The ladder logic routines for the macro instructions are stored in a common library file in the second memory section. A directory is provided which lists a unique operation code for each macro instruction for each operation code, a starting address of the macro instruction routine in the second memory section. The directory facilitates access to the appropriate routine in order to perform the operation called for by the macro instruction.

An object of the present invention is to provide a mechanism by which custom instructions can be added to a set of programming instructions that are executable by a programmable controller.

Another object is to enable the definition of a macro instruction that defines a complex operation that is performed by calling a routine written as a series of ladder logic instructions.

DETAILED DESCRIPTION OF THE INVENTION

Figure 1:
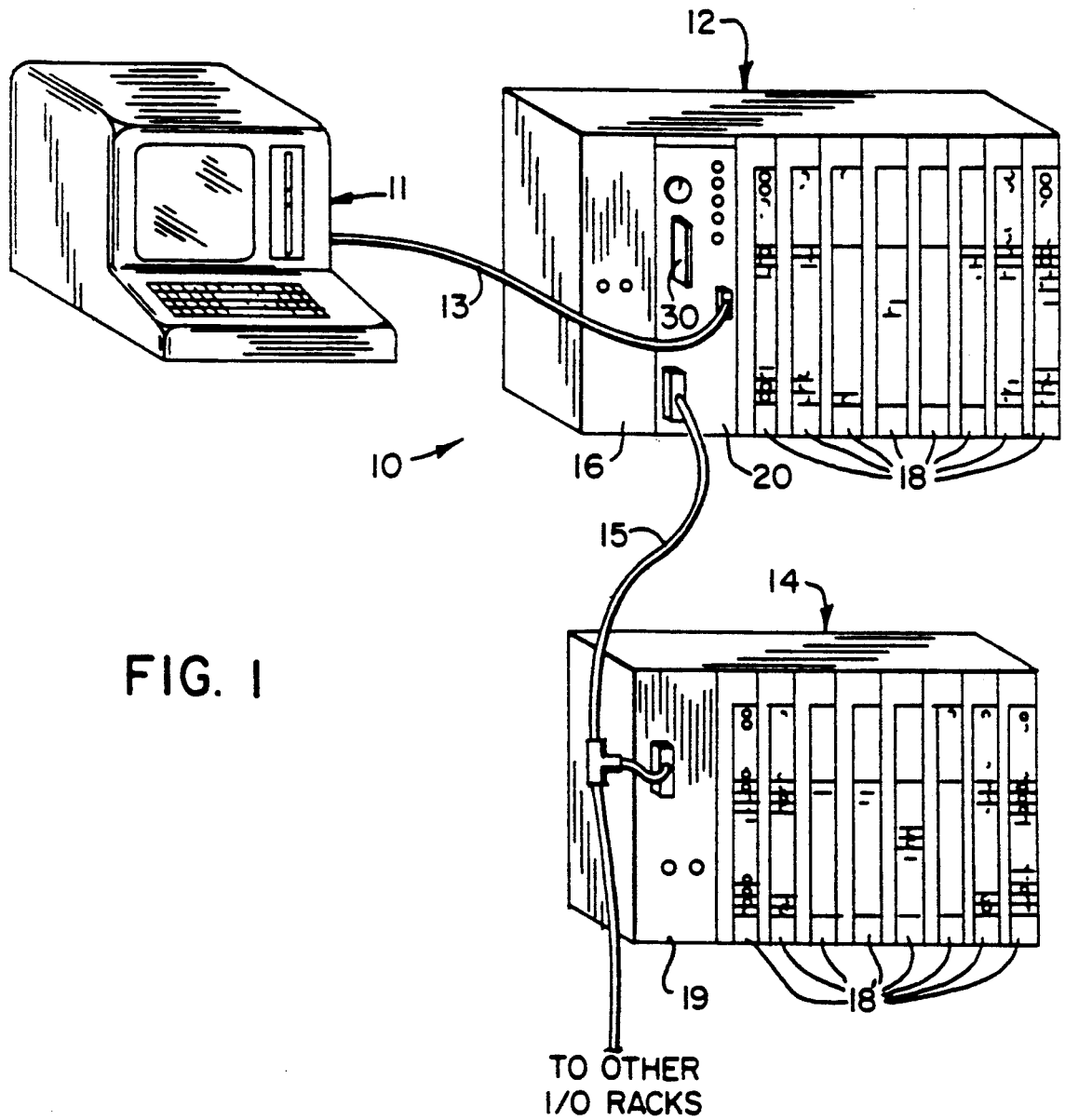
FIG. 1 is a pictorial representation of a programmable controller system which employs the present invention.

Referring to FIG. 1, a programmable controller system generally designated as 10 comprises a primary equipment rack 12 and a series of remote input/output (I/O) racks, such as rack 14, connected by a serial I/O network 15. An intelligent terminal 11 enables the user to program the controller 10 and monitor its operation.

The primary rack 12 houses a power supply 16, processor module 20 and a plurality of input/output (I/O) interface modules 18. The processor module 20 executes a user-defined control program that responds to signals from sensing devices on the controlled equipment by issuing signals to actuating devices on the same equipment. The sensing and actuating signals are coupled to the rack 12 through the input/output interface modules 18. The various modules 18 and 20 within the primary rack 12 are electrically interconnected by conductors on a backplane of the rack enabling data and control signals to be exchanged among the modules.

The processor module 20 receives programming instructions via the terminal 11 that is connected by cable 13 to a serial port connector on the front panel of the module. The serial I/O network 15 is coupled to a second connector on the front panel of the processor module 20 and to an adaptor module 19 in the remote I/O rack 14, enabling the processor module 20 to exchange data with another group of I/O modules 18' within the remote I/O rack. Alternatively, a local area network can be coupled to one of the connectors on the front panel of the processor module 20 enabling communication with a host computer and other programmable controllers coupled to that network.

A. Processor Module

Figure 2:
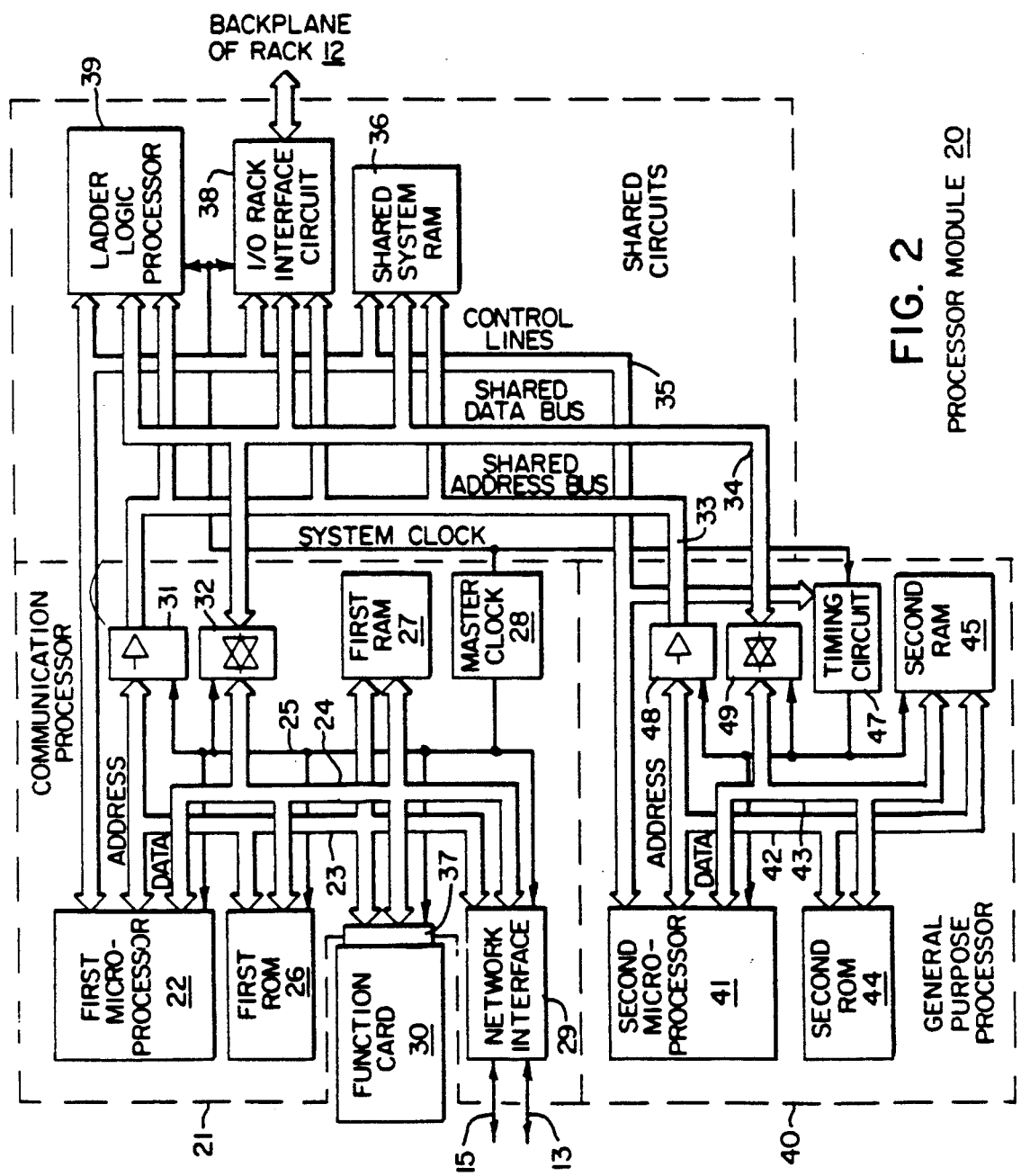
FIG. 2 is a functional block diagram of a processor module which forms part of the controller of FIG. 1.

With reference to FIG. 2, the processor module 20 includes a general purpose processor section 40 for user control program execution and a communication processor section 21 which handles the exchange of data over cable 13 and the serial I/O network 15. The processor module 20 also has a set of shared buses 33–35 which connect sections 21 and 40 with other data processing and storage components.

The communication processor section 21 is formed around a local address bus 23 and a local sixteen-bit wide data bus 24. Coupled to these buses is a first microprocessor 22 which may be a model 68000 manufactured by Motorola Inc., for example. The first microprocessor 22 executes a program stored in a first read only memory (ROM) 26 and utilizes a first random access memory (RAM) 27 for data storage. A master clock circuit 28 provides a system clock signal to the other components of the processor module 20 as well as providing specific timing signals via control lines 25 to the components of the communication processor section 21.

A major function assigned to the first microprocessor 22 is the control of communication with the programming terminal 11 and the serial I/O network 15. A network interface circuit 29 couples the local address and data buses 23 and 24 to the terminal cable 13 and to the remote I/O cable 15. The network interface circuit 29 translates the data between a parallel format used within the processor module and serial formats used to exchange data over terminal cable 13 and serial I/O network 15.

The local buses 23–25 of the communication processor section 21 also are coupled to a connector 37. A removable printed circuit board, referred to herein as function card 30, extends through a opening in the front panel of the processor module 20 (as shown in FIG. 1) and has a mating connector that engages the bus connector 37. The function card 30 can take several forms one of which contains memory in which machine control programs are archived. An intelligent type of function card contains another microprocessor dedicated to performing a special data processing task such as handling communication over a wide area network connected to the card.

The communication processor section 21 is coupled to other processor module components through a set of tri-state address gates 31 and a set of bidirectional tri-state data gates 32. Specifically, the set of gates 31 connects the local address bus 23 to the module's shared address bus 33, and the set of data gates 32 couples the local data bus 24 to a sixteen-bit wide shared data bus 34. A set of control lines 35 extends between processor module components and hereinafter is referred to as a control bus.

Figure 3:
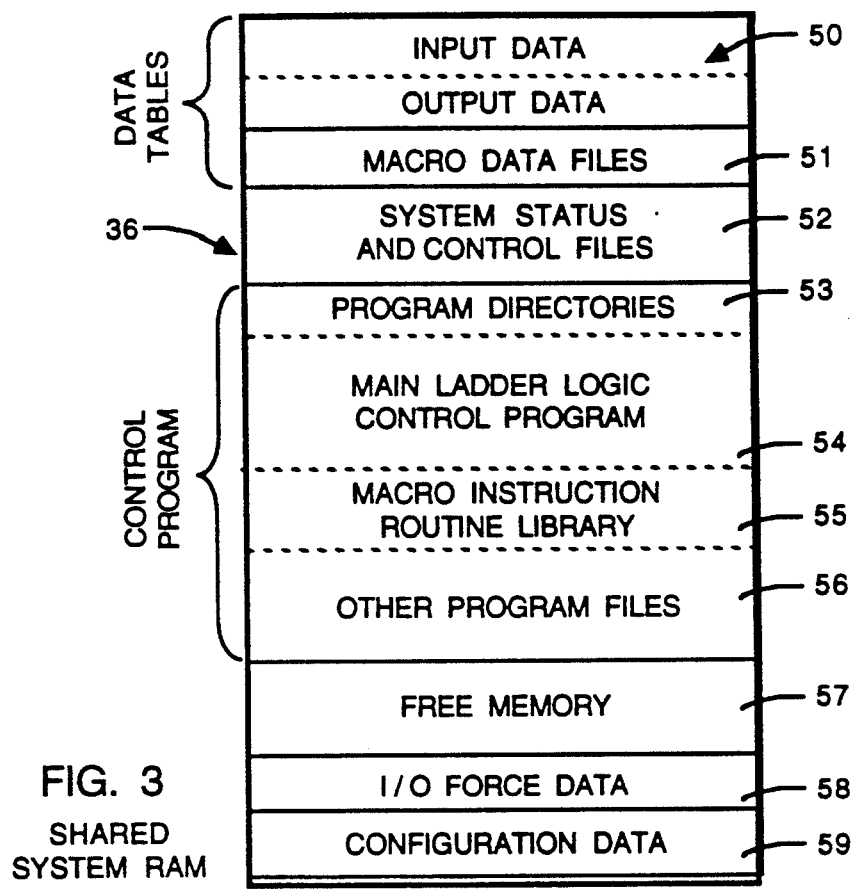
FIG. 3 is a memory map of a shared system random access memory in the processor module.

This coupling of buses allows the first microprocessor 22 to write and read data to and from a shared system RAM 36 coupled to the shared address and data buses 33 and 34. The organization of data within the shared system RAM 36 is illustrated in FIG. 3. A block of shared system RAM storage locations contains a set of data tables 50 and 51 for the processor module 20. The first data table 50 stores input data representing the state of the sensing devices and output data representing the state of the actuating devices on the equipment operated by the programmable controller system 10. Data from input type I/O modules 18 in the primary and remote racks 12 and 14 are stored in an organized manner in a first section of table 50. A second table section stores output data sent to control the actuating devices connected to output type I/O modules 18 in racks 12 and 14. Another block of storage locations 51 holds a group of data files each comprising a table of data to be exchanged between a main ladder logic control program and a macro instruction routine, as will be described.

The next section 52 of the shared system RAM 36 contains information regarding the status of the programmable controller 20 and its components. This section 52 also holds a control file for each of the macro-instruction routines, the details of which will be described. As may be necessary, additional data tables are stored in this section of the shared system RAM 36.

A portion of the shared system RAM 36 stores user defined programs for execution by the processor module and is divided into several program files 54–56. The first group of storage locations in this portion of memory is a directory 53 for locating each program file. The main ladder logic control program is stored in one file 54 and one or more other program files 55 contain ladder logic routines for macro instructions used in the main program. In the preferred implementation of the present invention, the routines for several macro instructions are stored in a common library file 55. Other program files contained in memory section 56 hold programs for background tasks, such as those which generate and transmit reports to a host computer. Interrupt routines also are stored in section 56.

Following the storage locations used by the user programs is a section of free memory locations 57. Another section of the shared system RAM 36 is an I/O force data table 58, similar to that used in previous programmable controllers to force the control data from specific sensing or actuating devices to a given logic state. A final memory section 59 at high addresses of the shared system RAM 36 stores system, processor module, and microprocessor level configuration data. For example, the configuration data defines number, location and type of each I/O module 18 in racks 12 and 14, as well as I/O port parameters and protocol data for external communication. The organization of the sections of the shared system RAM 36 is not critical and may vary from that depicted in FIG. 3.

Referring again to FIG. 2, an I/O rack interface circuit 38 is connected to the shared address and data buses 33 and 34 and the backplane of primary rack 12. This interface circuit periodically scans the I/O modules 18 in the primary rack to gather input data from the sensors and send output data to the actuating devices. The scanning is accomplished in a manner similar to that employed by previous processor modules by sequentially sending control signals to each I/O module 18. These control signals cause input type modules to send sensor data over the backplane and cause output type modules to store data sent by the processor module 20. The data exchanged with the I/O modules 18 in the primary rack 12 are stored in the I/O data tables of the shared system RAM 36.

A ladder logic processor 39 also is coupled to the shared address and data buses 33 and 34. The vast majority of instructions for a ladder logic control program operate on a single bit or word of data. The ladder logic processor 39 has been designed to execute the subset of ladder logic instructions which perform these basic control operations. This not only provides efficient execution of these instructions, it also frees the microprocessors in the module 20 to perform background and communication tasks simultaneously with the control program execution.

Certain functions, such as immediate I/O module access, data block transfers to the I/O modules 18, and complex mathematical and logical operations cannot be performed by the ladder logic processor 39. These complex control program functions are executed in the general purpose processor 40. This portion 40 of the processor module 10 contains a second microprocessor 41 connected to another set of local address and data buses 42 and 43, respectively. This pair of local buses 42 and 43 couples the second microprocessor 41 to a second ROM 44 and a second random access memory 45. The ROM 44 stores the firmware which is executed by the second microprocessor 41 to carry out the complex ladder logic operations.

A timing circuit 47 receives the system clock signal and derives therefrom the necessary timing and control signals for the second microprocessor 41 and memories 44 and 45. A pair of tri-state transmission gates 48 and 49 isolate the local address and data buses 42 and 43 of the general purpose processor 40 from the shared address and data buses 33 and 34. When these gates 48 and 49 are enabled in response to a command from the second microprocessor 41, the local buses 42 and 43 are electrically connected to shared buses 33 and 34. This enabling occurs only when the second microprocessor 41 has been granted access to the shared buses 33 and 34 by an arbitration circuit in the ladder logic processor 39.

B. The Control Program

The user programs the programmable controller 10 via terminal 11 which is a personal computer that executes an editor program for authoring a ladder logic control program. The control program for operating the controlled equipment is entered into the terminal keyboard to produce a ladder logic diagram that is displayed on the terminal screen in much the same manner as for previous programmable controllers. The editor program then converts the ladder diagram into operation codes (opcodes) and operand addresses which can be executed by the processor module 20. The converted program is transferred from the terminal 11 to the processor module 20. With reference to FIG. 2, the communication processor 21 receives the program and stores it in section 54 of the shared system RAM 36.

The control program includes instructions that operate on single bits of input data, such as is received from limit switches on the controlled machine. As noted previously, these instruction are executed by the ladder logic processor which because it is designed specifically for such instructions does so efficiently and fast. When the ladder logic processor 39 encounters an instruction which it is unable to execute, it notifies the second microprocessor 41 in the general purpose processor 40. These more complex instructions are handled by an interpreter program stored in the second ROM 44 and executed on the second microprocessor 41. The interpreter program comprises a set of machine language routines for performing each of the functions designated by the more complex control program instructions. After the general purpose processor 40 completes executing the more complex instruction, the ladder logic processor 39 is notified and reads the next instruction of the control program. This sharing of program execution responsibility is well understood by designers of programmable controllers and need not be described in detail.

The processor module also can execute a custom application routine written in machine language instructions for the second microprocessor 41. The routine is stored in a separate program file in section 56 of the shared system RAM 36. When a particular user or industry has a unique and complex control task, a custom application routine can be written to control that task. The routine is "called" from a rung of the main ladder logic control program which causes the ladder logic processor 39 to transfer program execution responsibility to the general purpose processor 40 in much the same manner that the transfer occurs to interpret the complex ladder logic instructions. However, instead of the processor firmware in the second ROM 44 interpreting the rung, the second microprocessor 41 executes the custom application routine written in machine language instructions and stored in the shared system RAM 36. U.S. Pat. No. 4,302,820 describes the basic process by which both the ladder logic control program and a machine language, custom application routine are executed by the same processor module. U.S. Pat. No. 5,042,002 relates to the use of a custom application routine to implement a sequencer type control system on a programmable controller.

C. Macro Instructions

In addition to the previously described instructions, the processor module 20 can execute ladder logic macro instructions that are defined by the programmable controller manufacturer or end user. Because the routines for performing the functions defined by the macro instructions are written in ladder logic, most if not all of the instructions for a given routine are executed by the ladder logic processor 39. This increases the speed of execution and eliminates overhead time previously lost during the transfer between ladder program file and a machine language program file. As will be described the macro instruction execution differs from the execution of a ladder logic subroutine, in that data values themselves are not exchanged individually between the main program and the macro routine. Instead, the data is exchanged by passing an address of a file that contains all the required data from the main ladder logic program. That file also will contain the results of the processing at the completion of the subroutine execution. The exchange of a file address instead of every item of data also speeds up the program execution.

Figure 4:
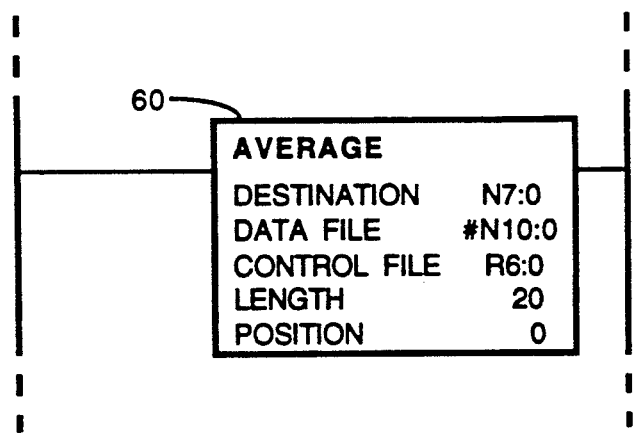
FIG. 4 is a rung of a ladder logic diagram control program which contains a macro instruction according to the present invention.

The macro instruction is defined by a ladder rung in the main ladder logic control program as shown in FIG. 4. The ladder logic macro instruction concept will be described in terms of an exemplary instruction which computes the average of a number of items of data. Since the macro instruction rung will always be executed, it does not contain a input operation and has only an output operation defined by box 60. The word "AVERAGE" in the box is a name that the programmer has assigned to the particular macro instruction. The next item in the macro instruction box 60 is a DESTINATION address of a data file in the shared system RAM 36 that is to contain the results of the processing. The entry designated DATA FILE identifies the address of a file in memory that contains the data items to be operated upon by the macro instruction, which in this example is the data to be averaged. The LENGTH parameter specifies the number (e.g. 20) of data items to be averaged.

Figure 5:
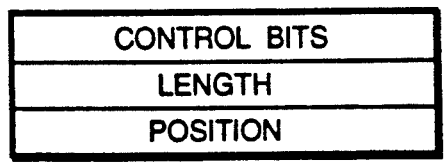
FIG. 5 depicts the contents of a control file used by the macro instruction.

The ladder diagram box 60 also designates the address of a CONTROL FILE, which contains status and process control bits as will be described. The final parameter for the macro instruction indicates the POSITION in the DATA FILE of the last data item that has been processed. This indication is useful should the processing be interrupted by a higher priority task, such as a interrupt routine. When the higher priority task is completed the POSITION indication enables execution of the macro instruction to resume with the next unprocessed data item. When an arithmetic overflow occurs, the POSITION indication designates a data item which caused that error, thus facilitating program debugging. The LENGTH and POSITION parameters are stored in field of the CONTROL FILE specified in the rung box 60. The data structure of this file is depicted in FIG. 5. Other configurations of the control file will be used for other types of macro functions. For example a macro instruction could be created to perform a proportional integral derivative (PID) function in which case the parameters of the PID would be stored in a control file.

When program development software in the terminal 11 translates the ladder diagram into instructions for execution by the processor module 20, a unique operation code (opcode) is assigned to each macro instruction name used in the program. The opcode and the other information in the instruction box 60 are used to form the ladder logic instruction. For example, the ladder rung shown in FIG. 4 becomes "AVERAGE OPCODE N7:0 #N10:0 R6:0,." This macro instruction specifies the opcode for the macro named "AVERAGE" and addresses of the destination, data and control files that are used by the macro instruction routine. The symbol # designates that the address is relative to the first address of the specified macro data file 51, whereas the other addresses are absolute.

One of the benefits of the present programmable controller 10 is that the opcode routines for a plurality of macro instructions can be stored in a single library file, although the routines could be stored as separate files. The organization of the macro instruction routine library file 55 is depicted by a memory map in FIG. 6. The routines for each macro instruction are placed in contiguous sections 62–65 of the library file 55. The final ladder logic instruction of each macro routine indicates the end of the routine so that the execution will not continue into the next routine in the library.

Figures 6, 7:
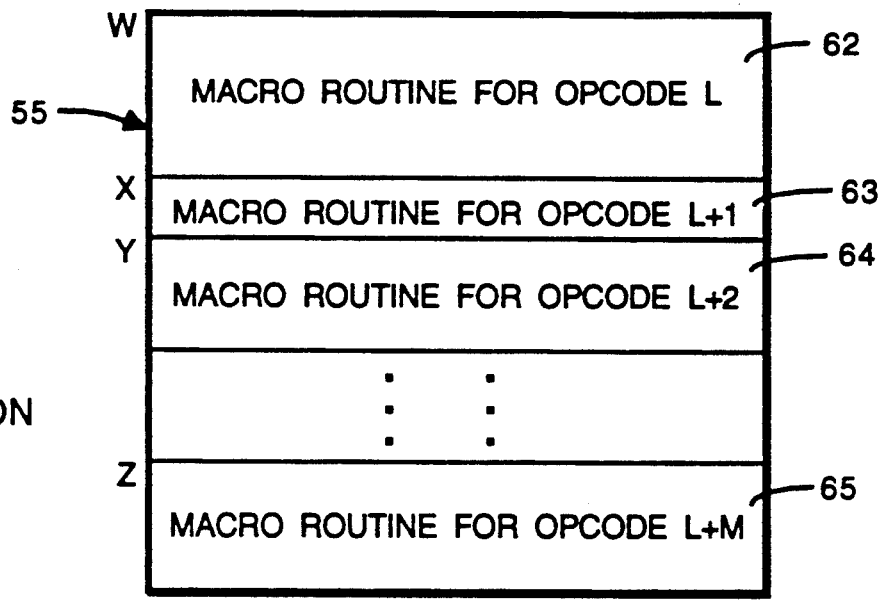
FIG. 6 is a memory map of a macro instruction routine library within the shared system random access memory.
FIG. 7 shows a macro instruction directory used by the system.

With reference to FIG. 7, one of the program directories 53 in the shared system RAM 36 indexes the macro instruction routines. Thus there is an entry in this directory 61 for each of the routines stored in the library file 55. The directory entry for a given macro instruction routine contains its opcode and the address in the macro instruction library 55 where the first instruction of that routine is stored.

During the execution of a user defined control program, each time the ladder logic processor 39 reads a new instruction, an instruction map table stored in the shared system RAM 36 is searched for a entry that contains the opcode for the new instruction. The instruction map table identifies how the opcode is to be executed. For each macro instruction the instruction map table specifies that a macro handler routine should be executed by the ladder logic processor 39. The macro handler routine saves the previous contents of the processor registers used during execution of the main ladder logic program. The macro directory 61 then is scanned by ladder logic processor 39 to locate the entry for the opcode of the macro instruction. When the entry is found, the ladder logic processor 39 obtains the macro routine address associated with the opcode in the directory. For example, if the macro instruction contained opcode L+1, the address of the corresponding routine in the library is X.

The address from the macro directory 61 is used to access the macro routine in the library file 55 within the shared system RAM 36. As noted previously, the macro routine is a set of ladder logic instructions, which typically are executable entirely by the ladder logic processor 39. That execution begins by the ladder logic processor obtaining the first ladder logic instruction of the designated macro routine at address X. The execution of the macro routine continues in the same manner as the execution of the main ladder logic program. When the macro routine requires data, the ladder logic processor 39 or the second microprocessor 41 whichever is executing the instruction that requires the data, obtains the data from the appropriate entry in the data file identified in the macro instruction which called the routine, for example the data file at address #N10:0 for the AVERAGE macro instruction in FIG. 4.

The designation of unique data, destination and control files enables the same macro routine to be used at several locations in the main ladder logic program with different files being specified at each location. For example, the AVERAGE macro instruction can be used to calculate the average of several groups of data. Each time the routine is used a different control file also is specified which enables various amounts of data to be averaged as designated by the LENGTH parameter in the associated control file.

As each item of the designated data file is read and processed, the ladder logic processor 39 increments the POSITION parameter in the associated control file. The intermediate processing values as well as the location in the processing are saved should the processing be interrupted for any reason. This enables the execution of the macro routine to resume subsequently at the place in the processing at which it was interrupted.

When the processing is complete the ladder logic processor 39 stores the results in the DESTINATION address (e.g. N7:0) specified in the macro instruction. This address can be a single storage location or the first of a series of storage locations when the result of the processing is several items of data. The last instruction in the macro routine indicates that the program execution is to return to the main ladder logic program. When the ladder logic processor encounters that instruction, its registers are restored to the values that were saved when macro routine commenced. This action causes a resumption of the main ladder logic program at the rung following the one that contains the macro instruction. Any of the other instructions of the main ladder logic program can read the results of the macro routines processing by accessing the DESTINATION address.

If the macro instruction merely operates on a single item of data and performs the operation relatively fast, a control file may not be required. For example, a macro instruction which performs a trigonometric function, such as finding the sine of an angle, does not require a control file. The function will be performed relatively fast and should not be suspended by an interrupt.

The invention being claimed is:

1. A programmable controller for operating a machine comprising:
    a first means for storing a ladder logic control program having a plurality of ladder logic instructions, one of said instructions being a macro instruction which specifies an operation code, a first file containing data to be processed by the macro instruction, a second file containing control data, and a storage location for a result produced by execution of the macro instruction;
    a ladder logic processor for executing a subset of the plurality of ladder logic instructions, which subset includes the macro instruction;
    microprocessor for executing ladder logic instructions which said ladder logic processor is unable to execute;
    a second means for storing the first and second files and the result produced by execution of the macro instruction;
    a third means for storing a macro instruction routine having a plurality of ladder logic instructions which are executed by said ladder logic processor in response to execution of the macro instruction; and
    means which connects said ladder logic processor, microprocessor and first, second and third means for storing for the exchange of data and program instructions.

2. The programmable controller as recited in claim 1 wherein said third means for storing comprises:
    storage locations for a library file containing a plurality of macro instruction routines; and
    storage locations for a directory containing a designation of the operation code for each of the plurality of macro instruction routines, and an address of a starting location for each of the plurality of macro instruction routines.

3. The programmable controller as recited in claim 2 wherein said ladder logic processor responds to an operation code specified in a macro instruction by reading, from said third means for storing, a starting address associated with the operation code.

4. The programmable controller as recited in claim 1 wherein said second file contains a designation of an amount of data in the first file.

5. The programmable controller as recited in claim 4 wherein said second file further contains a designation of which data in the first file have been processed by the macro instruction routine.

6. A programmable controller for operating a machine to perform functions defined by a control program formed by a plurality of ladder logic instructions, the programmable controller comprising:
    a ladder logic processor for executing a subset of the plurality of ladder logic instructions;
    microprocessor for executing ladder logic instructions which said ladder logic processor is unable to execute;
    a first means, coupled to said microprocessor, for storing a machine language program executable by said microprocessor for interpreting ladder logic instructions;
    a second means, coupled to said ladder logic processor and said microprocessor, for storing the control program which contains a ladder logic instruction that causes said microprocessor to execute the machine language program, and which contains another ladder logic instruction that is a macro instruction executable by said ladder logic processor and that specifies an operation code, a first file containing data to be processed by the macro instruction, a second file containing control data, and a storage location for results produced by execution of the macro instruction;

a third means, coupled to said ladder logic processor, for storing the first and second files; and a fourth means, coupled to said ladder logic processor, for storing a macro instruction routine having a plurality of ladder logic instructions which are to be executed by said ladder logic processor in response to execution of the macro instruction.

7. The programmable controller as recited in claim 6 wherein said second file contains a designation of an amount of data in the first file.

8. The programmable controller as recited in claim 7 wherein said second file further contains a designation of which data in the first file have been processed by the macro instruction routine.

9. A programmable controller, for operating a machine in response to execution of a control program including ladder logic instructions, comprising:

a ladder logic processor for executing ladder logic instructions;

a first means, coupled to said ladder logic processor, for storing the control program in which some of the ladder logic instructions are macro instructions, with each macro instruction specifying a different operation code, a first file containing data to be processed by the macro instruction and a storage location for results produced by execution of the macro instruction;

a third means, coupled to said ladder logic processor, for storing the first file for each macro instruction; and a fourth means, coupled to said ladder logic processor, for storing a library file having a ladder logic routine for each macro instruction, and storing a directory containing a designation of the operation codes for each macro instruction and associated with that designation an address of a starting location of a routine in the library file.

10. The programmable controller as recited in claim 9 wherein each micro instruction also specifies a second file that contains a designation of an amount of data in the first file and a designation of which data in the first file have been processed by the ladder logic routine; wherein the second file is stored in said third means for storing.

11. The programmable controller as recited in claim 9 wherein one of the macro instructions stored in said first means for storing also specifies a second file; and said third means for storing contains a second file of control data for use by the ladder logic processor in executing the one macro instruction.

* * * * *